UNITED STATES PATENT OFFICE.

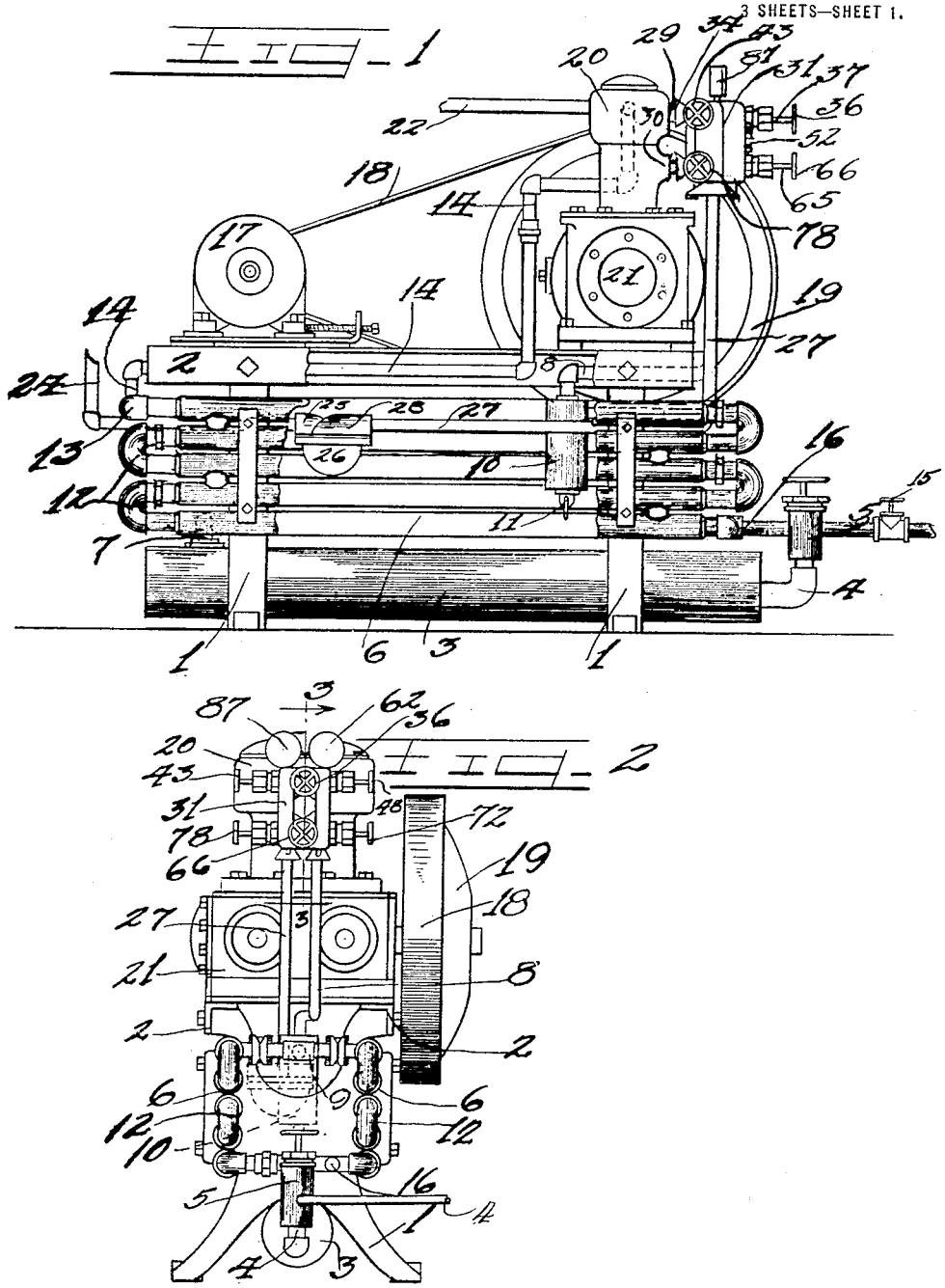

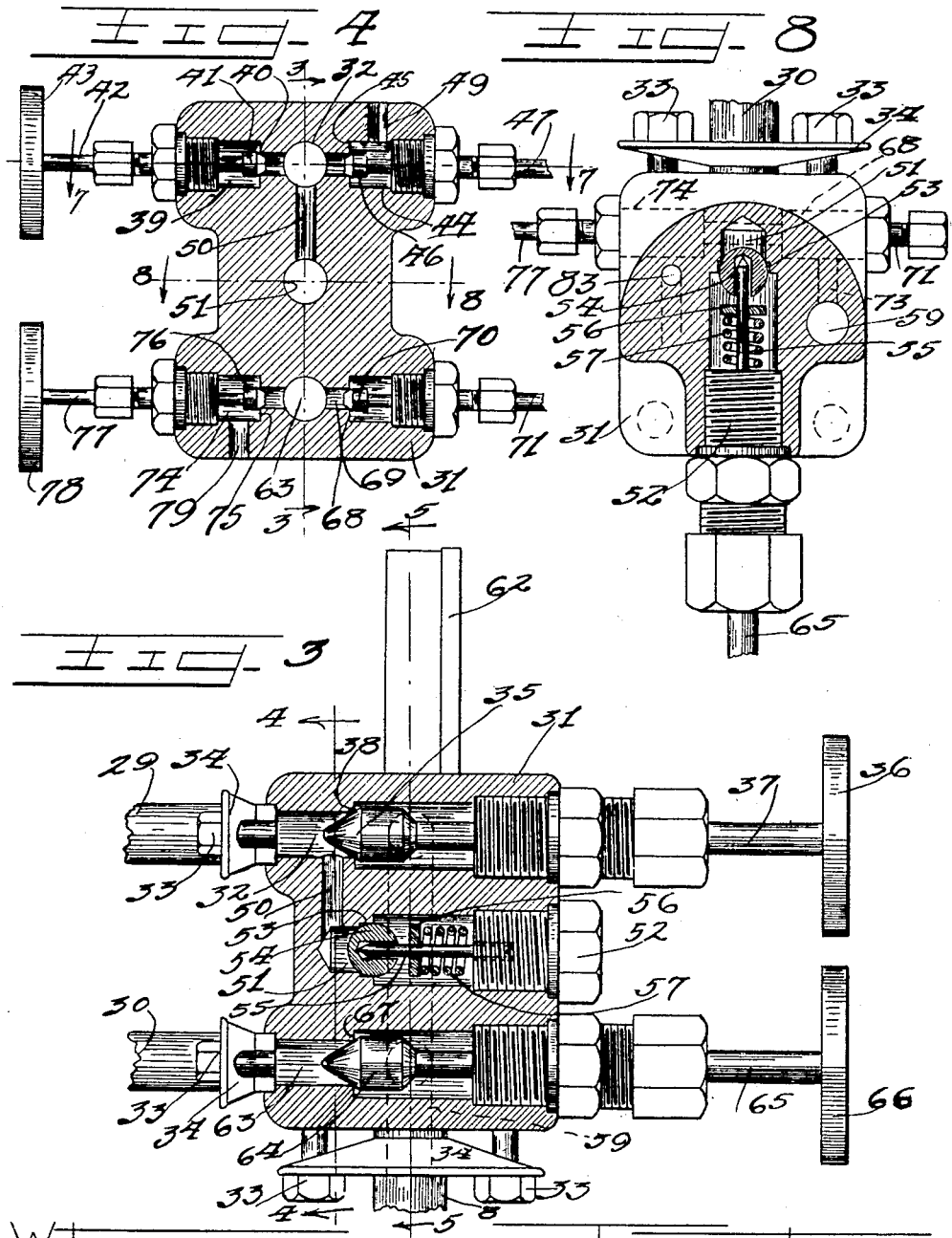

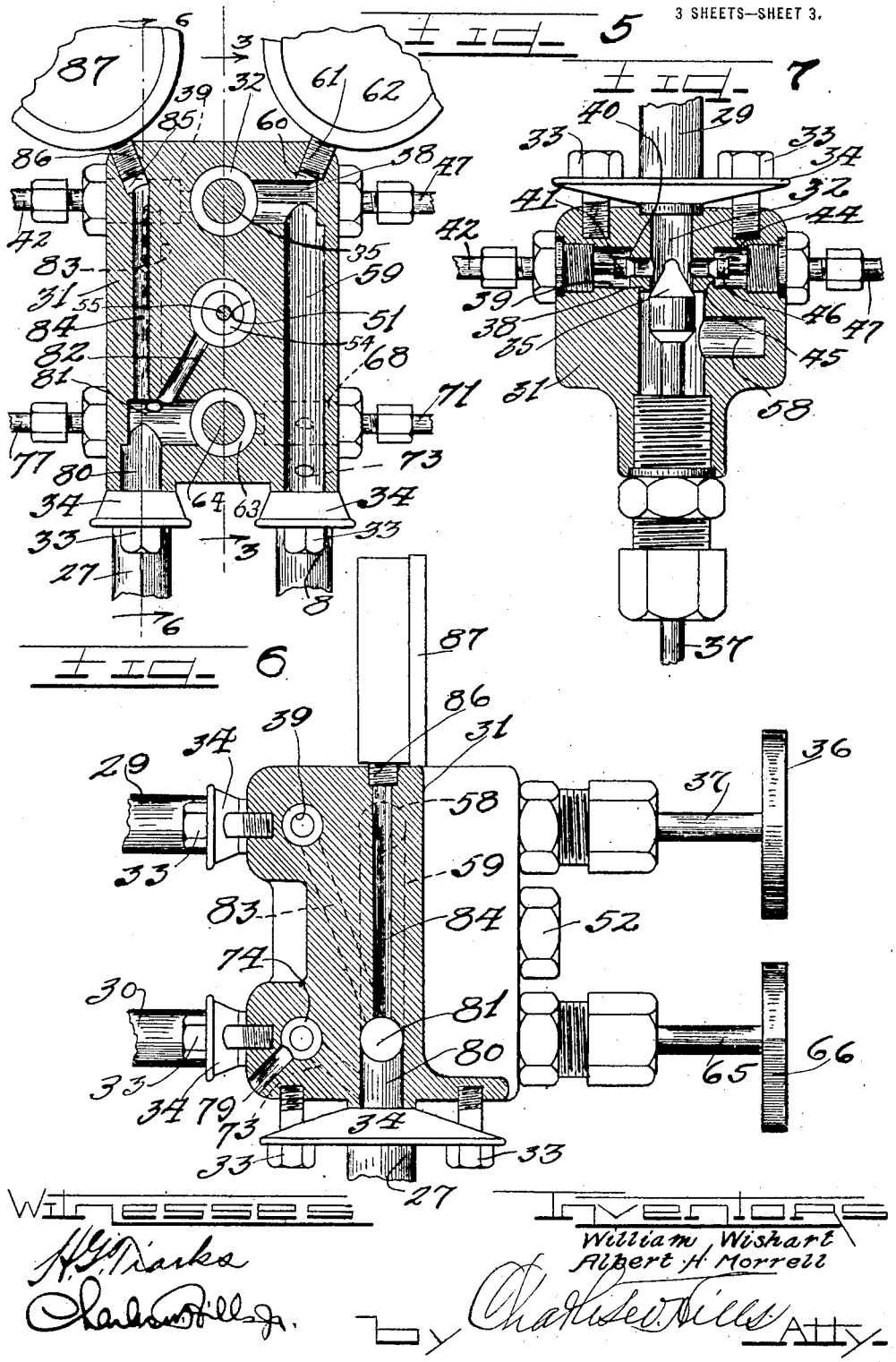

WILLIAM WISHART AND ALBERT H. MORRELL, OF CLINTON, IOWA, ASSIGNORS TO CLINTON REFRIGERATING COMPANY, A CORPORATION OF IOWA.

VALVE-MANIFOLD.

1,397,912.  Specification of Letters Patent.  Patented Nov. 22, 1921.

Application filed February 16, 1920. Serial No. 359,032.

*To all whom it may concern:*

Be it known that we, WILLIAM WISHART and ALBERT H. MORRELL, citizens of the United States, and residents of the city of Clinton, in the county of Clinton and State of Iowa, have invented certain new and useful Improvements in a Valve-Manifold; and we do hereby declare that the following is a full, clear, and exact description of the same, reference being had to the accompanying drawings, and to the numerals of reference marked thereon, which form a part of this specification.

This invention relates more particularly to an improved type of a valve manifold or header adapted for use on refrigerating machines or similar devices for controlling the flow of a refrigerating fluid to and from a compressor of a refrigerating system.

It is an object of this invention to provide a valve manifold or header of improved construction and adapted to be connected between the compressor and the condenser of a refrigerating machine for controlling the flow of the refrigerant through the machine.

It is a further object of the invention to provide a header having a plurality of valves therein adapted to permit the flow of a fluid through the header in one direction or in a reverse direction by adjusting the valves.

Another object of the invention is the construction of a manifold having pressure gages mounted thereon for registering the pressure of the fluid passing through the manifold.

It is also an object of the invention to provide a manifold having a plurality of main valves and a plurality of auxiliary valves associated with said main valves to permit the reversal of the direction of flow of a fluid through the manifold.

It is an important object of this invention to provide a valve manifold of simple and effective construction adapted for use in a refrigerating system for controlling the flow of a refrigerant between the compressor and the condenser forming a part of the refrigerating system.

Other and further important objects of this invention will be apparent from the disclosures in the drawings and specification.

The invention (in a preferred form) is illustrated in the drawings and hereinafter more fully described.

On the drawings:

Figure 1 is a side elevation of a refrigerating machine equipped with a valve manifold embodying the principles of this invention.

Fig. 2 is an end elevation thereof.

Fig. 3 is an enlarged vertical section of the valve manifold taken on line 3—3 of Fig. 2 with parts shown in elevation.

Fig. 4 is a section taken on line 4—4 of Fig. 3 with parts in elevation.

Fig. 5 is a section taken on line 5—5 of Fig. 3 showing parts in elevation.

Fig. 6 is a section taken on line 6—6 of Fig. 5 with parts disclosed in elevation.

Fig. 7 is a section taken on line 7—7 of Fig. 4 with parts in elevation.

Fig. 8 is a section taken on line 8—8 of Fig 4 showing parts in elevation.

As shown on the drawings—

The reference numeral 1 indicates a pair of supports or standards connected together at their upper ends by a pair of angle bars 2 to form a table or supporting framework. A refrigerant tank 3 is disposed longitudinally beneath the table and is attached by any suitable means to the standards 1. The refrigerant tank 3 has one end of an outlet pipe 4 connected to one end thereof. The outlet pipe 4 is provided with a control valve 5, and has the other end thereof connected with the inlet end of an expansion coil, not shown but mounted in a chamber of a refrigerator forming a part of the refrigerating system. Supported on each side of the table is a condenser coil 6, the lower end of which is connected to the refrigerant tank 3 by a piping 7. The upper end of each condenser coil 6 is connected to the lower end of a pipe 8 by means of a connecting pipe or header 9. Connected in the pipe 8 is an oil trap 10 provided with a drain cock or faucet 11. Each condenser coil 6 is provided with a water cooling coil 12 which runs through the various members comprising the condenser coil. The water coils 12 are connected together by a connecting pipe or header 13 to which one end of a connecting pipe 14 is connected. A valve 15 is provided in a water supply pipe 16 to permit water to be circulated through the cooling coils 12. From the coils 12 the water flows through the connecting pipe 14, and through a compressor cooling jacket, and is discharged through an outlet pipe 22.

Mounted near one end upon the table or frame top 2 is a power plant or motor 17 adapted to drive a belt 18 which is engaged around a fly wheel or driving pulley 19 of a compressor 20. The compressor is of a duplex vertical type and is mounted on a crank case 21 opposite the motor 17. Attached to the water jacket of the compressor is one end of the water outlet pipe 22. Attached to the outlet end of the refrigerant expansion coil located in the refrigerator of the refrigerating system is one end of a pipe 24 the other end of which is connected with the inlet elbow 25 of a scale trap 26. A pipe 27 has one end thereof connected with the outlet elbow 28 of the scale trap 26. The inlet end of the expansion coil is connected with the valve 5. The pipe 27 is bent to extend upwardly along one side of the compressor.

Connected with a pressure or refrigerant outlet chamber of the compressor is a discharge pipe 29. A refrigerant intake pipe 30 is provided and has one end thereof connected with an intake or suction chamber of the compressor.

Connected with the pipes 8, 27, 29, and 30 is a valve manifold or header embodying the principles of this invention and comprising a block, casing, or housing 31 provided with a horizontal outlet passage 32 located in the upper central portion of the manifold block 31. Rigidly secured to the block 31 by screw bolts 33 is a pipe connector 34 one end of which projects into one end of the outlet passage 32. The outer end of the outlet pipe 29 is secured in the pipe connector 34 to communicate with the passage 32. A control valve 35 is provided in the outlet passage 32, and said valve is adapted to be manually operated by means of a hand wheel 36 engaged on the outer end of a valve stem 37. The valve 35 is adapted when closed to seat against a valve seat 38 provided in the outlet passage 32, as shown in Fig. 3. Provided in the block 31 at right angles and communicating with the outlet passage 32 is a by-pass passage 39 provided with a valve seat 40. Disposed in the passage 39 is a by-pass, auxiliary, or cut-out valve 41 adapted to be operated by a valve stem 42 and a hand wheel 43. Also provided in the block 31 is a passage 44 disposed at right angles to the passage 32 and communicating therewith. A valve seat 45 is provided in the passage 44 and is adapted to have a blow-off valve 46 seat thereagainst. The blow-off valve 46 is adapted to be actuated by a stem 47 and a hand wheel 48. Communicating with the passage 44 and opening through one of the walls of the block 31 is a blow-off passage 49.

A vertical passage 50 is provided in the block 31 and has the upper end communicating with the passage 32 between the valve 35 and the pipe connector 34. The lower end of the passage 50 connects with the inner closed end of a horizontal passage 51 having the outer end closed by a screw plug 52. A valve seat 53 is formed in the passage 51 to permit a safety valve 54 to be seated thereagainst. Slidably projecting into the safety valve 54 and into the screw plug 52 is a pin 55 having a collar 56 rigidly secured thereon. A spring 57 is engaged around the pin 55 and has one end seated against the collar 56 and the other end bearing against the inner end of the screw plug 52 to normally hold the safety valve in closed position. A short horizontal passage 58 is provided in the upper portion of the block 31 and said passage at its inner end communicates with the outlet passage 32 to the outside of the valve 35. A vertical outlet passage 59 is provided in the block 31 so that the upper end of said passage communicates with the short passage 58. The lower end of the vertical outlet passage opens through the bottom of the block 31 and connects up with the upper end of the pipe 8 which leads to the condenser coils 6. A threaded inclined passage 60 communicates with the short passage 58 and removably threaded into the passage 60 is a threaded stem 61 of a high pressure gage 62.

A horizontal intake passage 63 is provided in the lower central portion of the block 31. The outer end of the intake pipe 30 is connected to the block 31 by bolts 33 and a pipe connector 34. The intake pipe 30 communicates with the intake passage 63. A control valve 64 is provided in the passage 63 and said valve is adapted to be manually operated by means of a stem 65 and a hand wheel 66. The valve 64 is adapted when closed to seat against a valve seat 67 provided in the intake passage 63. Provided in the block 31 at right angles and communicating with the intake passage 63 is a cut-out passage 68 provided with a valve seat 69. Disposed in the passage 68 is a by-pass, auxiliary, or cut-out valve 70 adapted to be operated by a valve stem 71 and a hand wheel 72. Connecting the passage 68 with the outlet passage 59 is an inclined by-pass passage 73. Also provided in the block 31 is a passage 74 disposed at right angles to the passage 63 and communicating therewith. A valve seat 75 is formed in the passage 74 and is adapted to have an air suction or an intake valve 76 seat thereagainst. The air suction valve 76 is operated by a stem 77 and a hand wheel 78. Communication with the passage 74 and opening through the bottom of the block 31 is an air suction passage 79.

A vertical inlet passage 80 is provided in the block 31 and the lower end of said passage opens through the bottom of the block 31, and communicates with the upper end of the pipe 27. The inner or upper end of the passage 80 communicates with the closed end of a short horizontal passage 81. The other end of the passage 81 is connected up with the passage 63. As shown in Fig. 5, an inclined passage 82 connects the passage 51 with the passage 81. An inclined passage 83 in the block 31 connects the passage 81 with the upper by-pass passage 39. A vertical gage passage 84 is provided in the block 31. The lower end of the passage 84 connects with the horizontal passage 81 while the upper end of the passage 84 connects with the lower end of a short threaded inclined passage 85. Removably threaded into the inclined passage 85 is a threaded stem 86 of a low pressure gage 87.

The operation is as follows:

The refrigerator, provided with an expansion coil, may be located in any desired location with the expansion coil connected by means of the pipes 4 and 24 with the compact refrigerating unit disclosed in Fig. 1. The refrigerator is cooled by means of the refrigerating fluid which flows from the tank 3 when the valve 5 is open, through the pipe 4, into the expansion coil where the compressed refrigerating fluid is permitted to expand and absorb the heat from the refrigerator and so cool the same. The heated and expanded refrigerating fluid passes from the expansion coil out through the pipe 24, through the scale trap 26, and into the pipe 27.

The valve manifold is connected with the compressor and with the condenser. From the pipe 27 the heated and expanded refrigerating fluid enters the manifold passages 80 and 81 and flows into the compressor intake passage 63. During this operation the lower cut-out or by-pass valve 70 and the air suction valve 76 are closed. The intake control valve 64 is opened, thereby permitting the refrigerating fluid to pass through the pipe 30 into the suction chamber of the compressor 20. From the passage 81 the refrigerating fluid is permitted to pass upwardly through the gage passage 84 into the low pressure gage 87 which serves to indicate the pressure of the refrigerating fluid entering the compressor.

When the refrigerating unit is in operation the motor 17 operates the compressor which in turn causes the heated and expanded refrigerating fluid entering the compressor to be compressed and pumped into the compression chamber in the upper portion of the compressor. Normally the upper by-pass valve 41 and the blow-off valve 46 are closed.

When it is desired to supply the compressed refrigerating fluid from the compressor to the refrigerator expansion coil, the outlet control valve 35 of the manifold is open. The compressed heated refrigerating fluid flows from the compressor through the outlet pipe 29 and the outlet passage 32 into the short horizontal passage 58. From the passage 58 part of the compressed refrigerating fluid passes upwardly into the high pressure gage 62, which indicates the pressure of the compressed fluid. From the passage 58 the refrigerating fluid also passes downwardly through the vertical passages 59 and leaves the valve manifold by way of the pipe 8. The compressed refrigerating fluid is pumped or forced through the oil trap 10 and then passes by way of the pipe header 9, through the condenser coils 6.

The compressed heated refrigerating fluid passing through the condenser coils 6, is cooled by opening the cold water valve 15, to permit cold water to enter the cooling coils 12. The cooling water is thus permitted to circulate through the condensing cooling coils 12, and then passes through the header 13, the pipe 14, and the compressor water jacket, to be discharged through the water discharge pipe 22. The compressed cooled refrigerating fluid, after passing through the condenser coils 6, enters the storage tank 3 by way of the pipe 7. By opening the control valve 5, the refrigerating fluid is permitted to flow from the tank 3, through the pipe 4, into the inlet end of the expansion coil located in the refrigerator.

The direction of flow of the refrigerating fluid through the manifold may be reversed by closing the valves 64 and 35 and opening the by-pass valves 70 and 41. The refrigerating fluid now enters the valve manifold by way of the pipe 8, and flows into the passage 59, and then through the by-pass passage 73, into the passages 68 and 63. The fluid from the compressor passes into the passage 32 and then through the open valve 41, into the by-pass 83 and the passage 80, into the pipe 27, through the trap 26, and then to the expansion coil by way of the pipe 24.

If at any time it becomes necessary to blow off some of the compressed refrigerating gas, the blow-off valve 46 may be opened. By opening the air suction valve 76, air may be sucked in through the air intake passage 79.

We are aware that numerous details of construction may be varied through a wide range without departing from the principles of this invention, and we therefore do not purpose limiting the patent granted otherwise than necessitated by the prior art.

We claim as our invention:

1. A valve manifold comprising a passaged block, a plurality of main valves in said block adapted to be opened to permit a refrigerating fluid to flow through the manifold in one direction, and a plurality of by-pass valves in said block adapted to be opened when the main valves are closed to permit a reversal of flow of the fluid through the manifold.

2. A valve manifold comprising a passaged block, a plurality of main valves in said block adapted to be opened to permit a fluid to flow through the manifold in one direction, a plurality of by-pass valves in said block adapted to be opened when the main valves are closed to cause the reversal of flow of the fluid through the manifold, and a blow-off valve in said block adapted to be opened to permit the fluid to be blown off.

3. A valve manifold comprising a passaged block, a main valve in said block, a by-pass valve in said block adapted to be opened when the main valve is closed, a blow-off valve in said block adapted to be opened to permit a fluid to be blown off, and gages on the block and connected with the block passages for indicating the pressure of a fluid passing through the block.

4. A valve manifold comprising a block having a plurality of communicating passages therein, a main valve in one of said passages, a by-pass valve in another of the passages, and a blow-off valve in still another of the passages, said valves adapted to be operated independently of one another.

5. A valve manifold comprising a block having an intake passage, an outlet passage, a safety valve passage, and by-pass passages therein, said by-pass passages connecting the intake and outlet passages with the safety valve passage, an inlet valve in the intake passage, an outlet valve in the outlet passage, and a safety valve in said safety valve passage.

6. A valve manifold comprising a block having a plurality of communicating passages therein, an intake valve in one of said passages, an outlet valve in another passage, a safety valve in still another of said passages, by-pass valves in certain of the block passages to permit reversal of flow of a fluid through the block, a blow-off valve in another of the block passages, and an air suction valve in still another of the block passages.

7. A valve manifold comprising a block having a plurality of communicating passages therein, pressure gages mounted on said block and communicating with certain of said passages, an inlet valve in one of said passages, an outlet valve in another of the passages, a safety valve in still another of the block passages, by-pass valves in certain of the block passages adapted to permit reversal of flow of a fluid through the block, and a blow-off passage therein communicating with the passage in which the blow-off valve is disposed.

In testimony whereof we have hereunto subscribed our names in the presence of two subscribing witnesses.

WILLIAM WISHART.
ALBERT H. MORRELL.

Witnesses:
H. C. MOORMANN,
E. A. BOYSEN.